US012528464B2

(12) United States Patent
Ishikawa

(10) Patent No.: US 12,528,464 B2
(45) Date of Patent: Jan. 20, 2026

(54) PARKING ASSISTANCE DEVICE

(71) Applicant: AISIN CORPORATION, Aichi (JP)

(72) Inventor: Kota Ishikawa, Kariya (JP)

(73) Assignee: AISIN CORPORATION, Aichi (JP)

(*) Notice: Subject to any disclaimer, the term of this patent is extended or adjusted under 35 U.S.C. 154(b) by 139 days.

(21) Appl. No.: 18/611,056

(22) Filed: Mar. 20, 2024

(65) Prior Publication Data

US 2024/0326802 A1 Oct. 3, 2024

(30) Foreign Application Priority Data

Mar. 31, 2023 (JP) ................................. 2023-058893

(51) Int. Cl.
| *B60W 30/06* | (2006.01) |
| *B60W 10/04* | (2006.01) |
| *B60W 10/18* | (2012.01) |
| *B60W 30/14* | (2006.01) |

(52) U.S. Cl.
CPC .......... *B60W 30/143* (2013.01); *B60W 10/04* (2013.01); *B60W 10/18* (2013.01); *B60W 2520/10* (2013.01); *B60W 2520/105* (2013.01); *B60W 2720/10* (2013.01); *B60W 2720/106* (2013.01)

(58) Field of Classification Search
CPC ...... B60W 10/06; B60W 10/08; B60W 10/04; B60W 10/18; B60W 30/143; B60W 30/06; B60W 2520/10; B60W 2520/105; B60W 2720/10; B60W 2720/106; B60W 2710/06; B60W 2710/18
USPC .......................................... 477/185; 701/101
See application file for complete search history.

(56) References Cited

U.S. PATENT DOCUMENTS

| 2002/0132702 A1* | 9/2002 | Muramoto ................ B60T 7/12 477/185 |
| 2008/0217511 A1 | 9/2008 | Oguma et al. |
| 2017/0029027 A1 | 2/2017 | Mizutani et al. |
| 2020/0031336 A1* | 1/2020 | Akatsuka .............. B60W 10/04 |
| 2021/0024057 A1* | 1/2021 | Ding ............... B60W 30/18072 |
| 2021/0213941 A1* | 7/2021 | Fukasawa .......... B62D 15/0285 |
| 2024/0166208 A1* | 5/2024 | Shi ...................... B60W 30/143 |
| 2024/0326783 A1* | 10/2024 | Ishikawa ............ B62D 15/0285 |

FOREIGN PATENT DOCUMENTS

| JP | 63-263233 A | 10/1988 |
| JP | 2008-227676 A | 9/2008 |
| JP | 2017-30482 A | 2/2017 |

OTHER PUBLICATIONS

CN112721920A with English translation; He et al.; Apr. 30, 2021 (Year: 2025).*

* cited by examiner

*Primary Examiner* — Roger L Pang
(74) *Attorney, Agent, or Firm* — Sughrue Mion, PLLC

(57) ABSTRACT

A parking assistance device includes: a target speed control unit that calculates a target speed for moving the vehicle subjected to assistance to a target parking position of the vehicle subjected to assistance; a speed feedback control unit that calculates a target acceleration based on deviation between the target speed and an actual speed of the vehicle subjected to assistance; a correction processing unit that corrects the target acceleration so that an absolute value becomes small when the target speed is constant; and a vehicle control unit that controls a braking and driving force of the vehicle subjected to assistance based on the target acceleration.

3 Claims, 9 Drawing Sheets

PARKING ASSISTANCE DEVICE

CROSS REFERENCE TO RELATED APPLICATIONS

This application is based on and claims priority under 35 U.S.C. § 119 to Japanese Patent Application No. 2023-058893, filed on Mar. 31, 2023, the entire content of which is incorporated herein by reference.

TECHNICAL FIELD

Embodiments of the present disclosure relate to a parking assistance device.

BACKGROUND DISCUSSION

Conventionally, parking assistance devices for vehicles (such as passenger cars) have been researched and developed and used. For example, a parking assistance device disclosed in JP 2017-30482 A assists parking by performing braking and driving force (braking force and driving force) control and steering control by an electronic control unit (ECU). In the braking and driving force control, for example, feedback (FB) control is used. Specifically, for example, first, target speed is calculated based on deviation between a parking target position and an actual position of a vehicle subjected to assistance. Next, a target acceleration is calculated based on the deviation between the target speed and the actual speed. Next, a required braking and driving force is calculated based on a deviation between the target acceleration and an actual acceleration. Then, the braking and driving force of the vehicle subjected to assistance is controlled based on the required braking and driving force.

However, in the above-described prior art, for example, unnecessary acceleration or deceleration for the vehicle subjected to assistance may occur due to various factors such as a road surface condition (step, low friction road surface, or the like) and an aging degradation of a braking and driving force device (engine, brake, or the like). In particular, when the target speed is constant, if unnecessary acceleration or deceleration occurs, an occupant easily feels deterioration of ride comfort, and thus improvement is desired.

A need thus exists for a parking assistance device which is not susceptible to the drawback mentioned above.

SUMMARY

A parking assistance device includes: a target speed control unit that calculates a target speed for moving the vehicle subjected to assistance to a target parking position of the vehicle subjected to assistance; a speed feedback control unit that calculates a target acceleration based on deviation between the target speed and an actual speed of the vehicle subjected to assistance; a correction processing unit that corrects the target acceleration so that an absolute value becomes small when the target speed is constant; and a vehicle control unit that controls a braking and driving force of the vehicle subjected to assistance based on the target acceleration.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of the present disclosure is disclosed. A configuration of the embodiment shown below, and actions, results, and effects brought by the configuration are examples. The present disclosure can be achieved by configurations other than that disclosed in the following embodiment, and at least one of various effects based on a basic configuration or derivative effects can be obtained.

A vehicle 1 of the present embodiment may be, for example, an automobile using an internal combustion engine which is not illustrated, as a drive source, that is, an internal combustion engine automobile, may be an automobile using an electric motor which is not illustrated as a drive source, that is, an electric automobile or a fuel cell automobile, or the like, may be a hybrid automobile using both of them as drive sources, or may be an automobile including another drive source. In addition, the vehicle 1 can be equipped with various transmission devices, and can be equipped with various devices necessary for driving the internal combustion engine and the electric motor, for example, systems, components, and the like. In addition, a type, the number, layout, and the like of a device related to driving of a wheel 3 in the vehicle 1 can be variously set.

Figure 1:
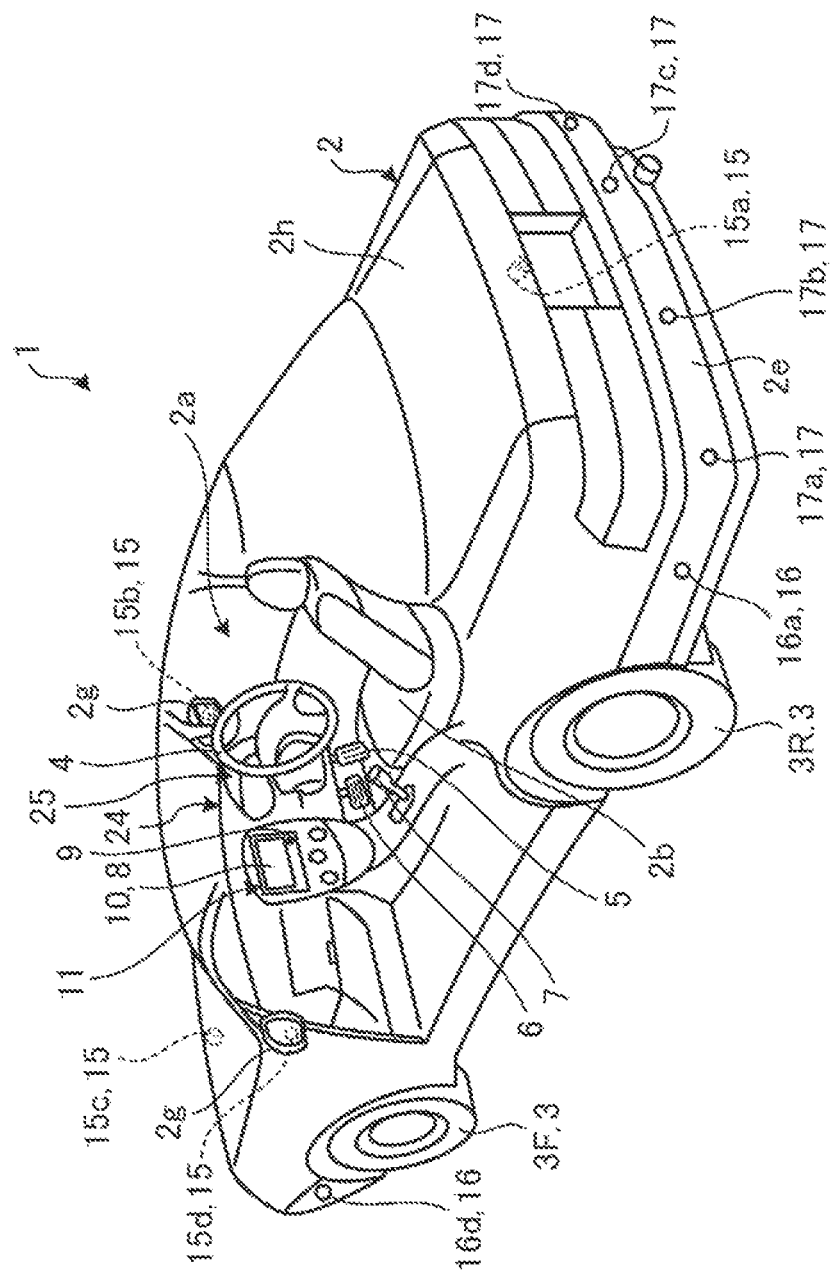
FIG. 1 is an external perspective view of a vehicle when a part of a vehicle interior is seen through in an embodiment.

FIG. 1 is an external perspective view of a vehicle 1 when a part of a vehicle interior is seen through in an embodiment.

Figure 2:
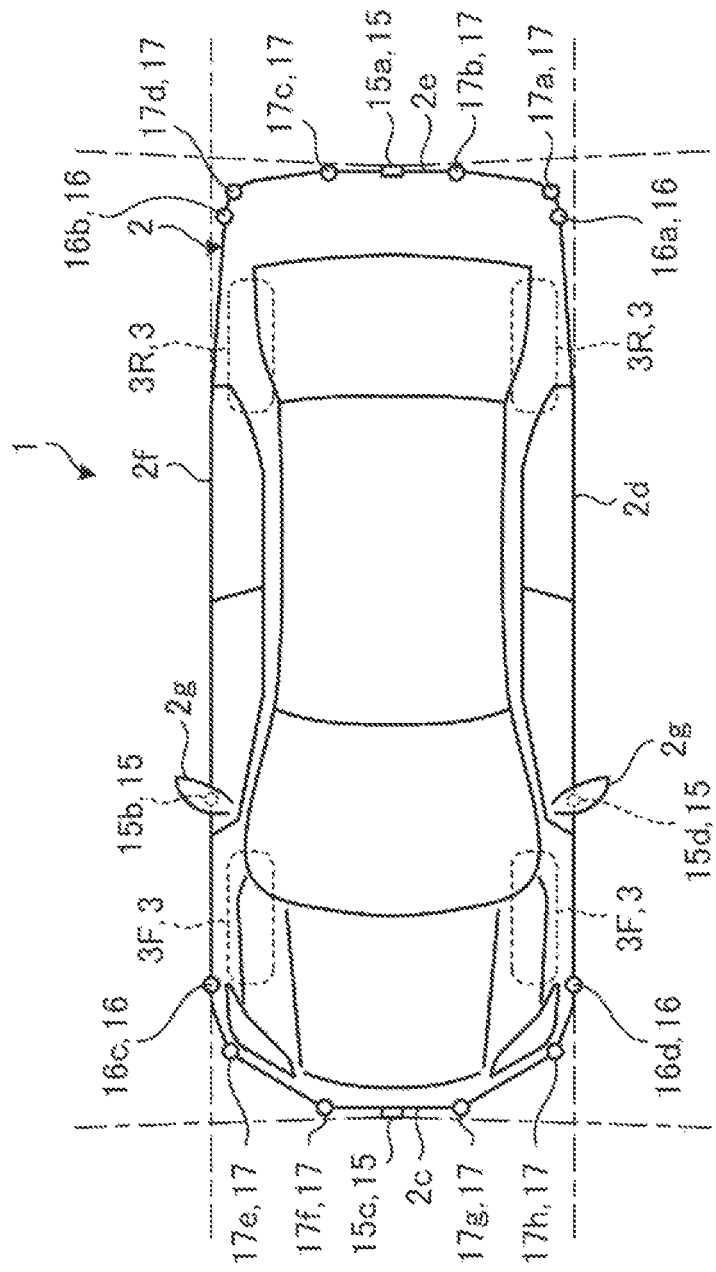
FIG. 2 is a plan view (overhead view) of the vehicle according to the embodiment.

FIG. 2 is a plan view (overhead view) of the vehicle 1 according to the embodiment. As illustrated in FIG. 1, a vehicle body 2 includes a vehicle interior 2a in which an occupant which is not illustrated rides. In the vehicle interior 2a, a steering unit 4, an acceleration operation unit 5, a braking operation unit 6, a shift operation unit 7, and the like are provided in a state of facing a seat 2b of a driver as an occupant.

The steering unit 4 is, for example, a steering wheel protruding from a dashboard 24.

The acceleration operation unit 5 is, for example, an accelerator pedal positioned at a foot of the driver. The braking operation unit 6 is, for example, a braking pedal positioned at a foot of the driver. The shift operation unit 7 is, for example, a shift lever protruding from a center console. Note that these configurations are not limited to those described above.

In the vehicle interior 2a, a display device 8 as a display output part and a sound output device 9 as a sound output part are provided. The display device 8 is, for example, a liquid crystal display (LCD), an organic electroluminescent display (OELD), or the like. The sound output device 9 is, for example, a speaker. In addition, the display device 8 is covered with an operation input part 10 that is transparent, such as a touch panel or the like. The occupant can visually recognize an image displayed on a display screen of the display device 8 via the operation input part 10.

In addition, the occupant can perform an operation input by touching, pushing, or moving the operation input part 10 with a finger or the like at a position corresponding to an image displayed on the display screen of the display device 8. The display device 8, the sound output device 9, the operation input part 10, and the like are provided, for example, in a monitor device 11 located at a center of the dashboard 24 in a vehicle width direction, that is, a left-right direction.

The monitor device 11 can have an operation input part which is not illustrated such as a switch, a dial, a joystick, or a push button. In addition, a sound output device which is not illustrated can be provided at another position in the vehicle interior 2a, the sound output device being different from the sound output device 9 of the monitor device 11, and sound can be output from the sound output device 9 of the monitor device 11 and the other sound output device. Note that the monitor device 11 can also be used as, for example, a navigation system or an audio system. In the vehicle interior 2a, a display device 12 (see FIG. 3) which is different from the display device 8 is provided.

Figure 3:
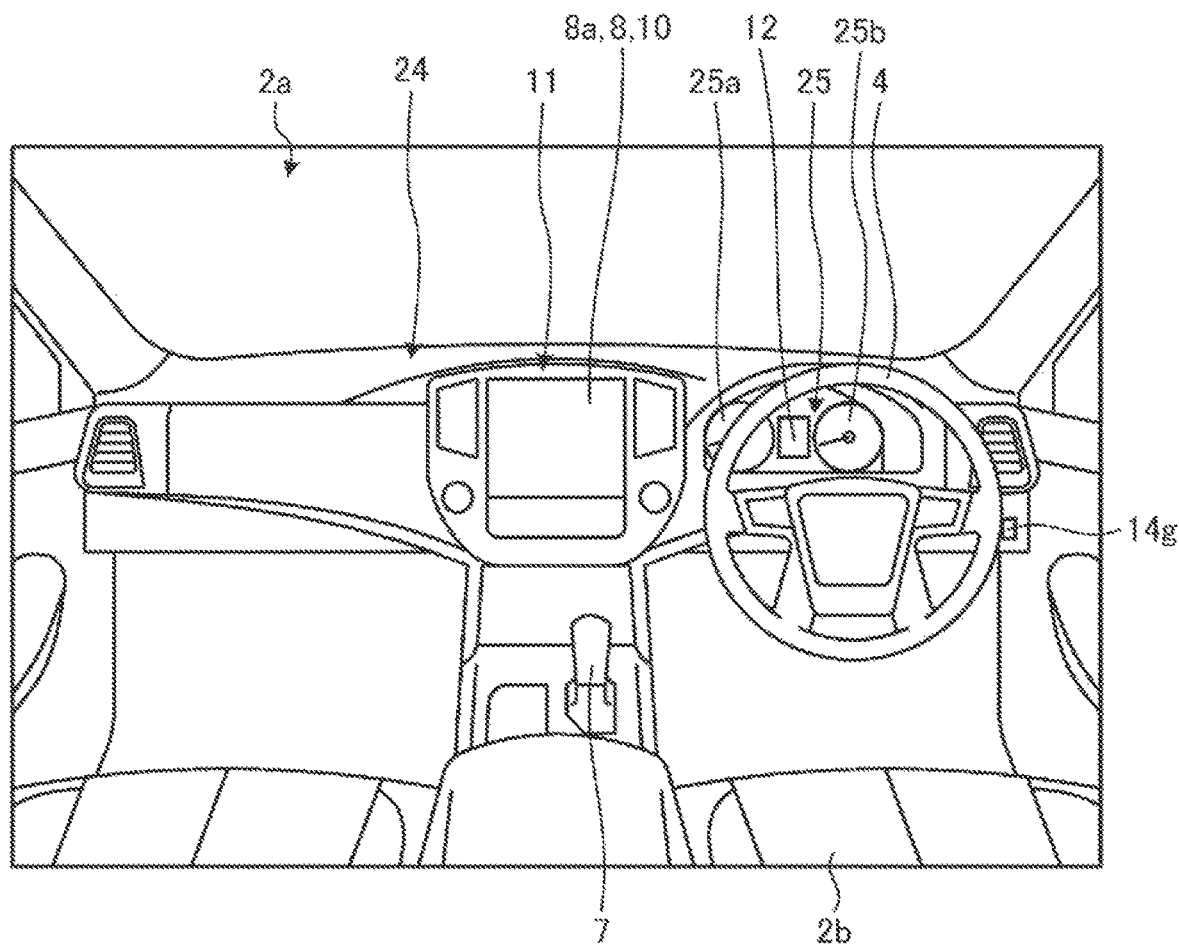
FIG. 3 is a configuration diagram of a dashboard of the vehicle when viewed from a rear of the vehicle in the embodiment.

FIG. 3 is a configuration diagram of a dashboard of the vehicle 1 when viewed from a rear of the vehicle in the embodiment; As exemplified in FIG. 3, the display device 12 is provided, for example, on a dashboard panel 25 of a dashboard 24, and is located between a speed indicator 25a and a rotation speed indicator 25b substantially at a center of the dashboard panel 25. A size of a screen of the display device 12 is smaller than a size of a screen of the display device 8 (FIG. 1). The display device 12 can mainly display an image indicating information related to parking assistance of the vehicle 1.

As illustrated in FIGS. 1 and 2, the vehicle 1 is, for example, a four-wheeled automobile, and has two left and right front wheels 3F and two left and right rear wheels 3R. All of these four wheels 3 can be configured to be steerable.

Figure 4:
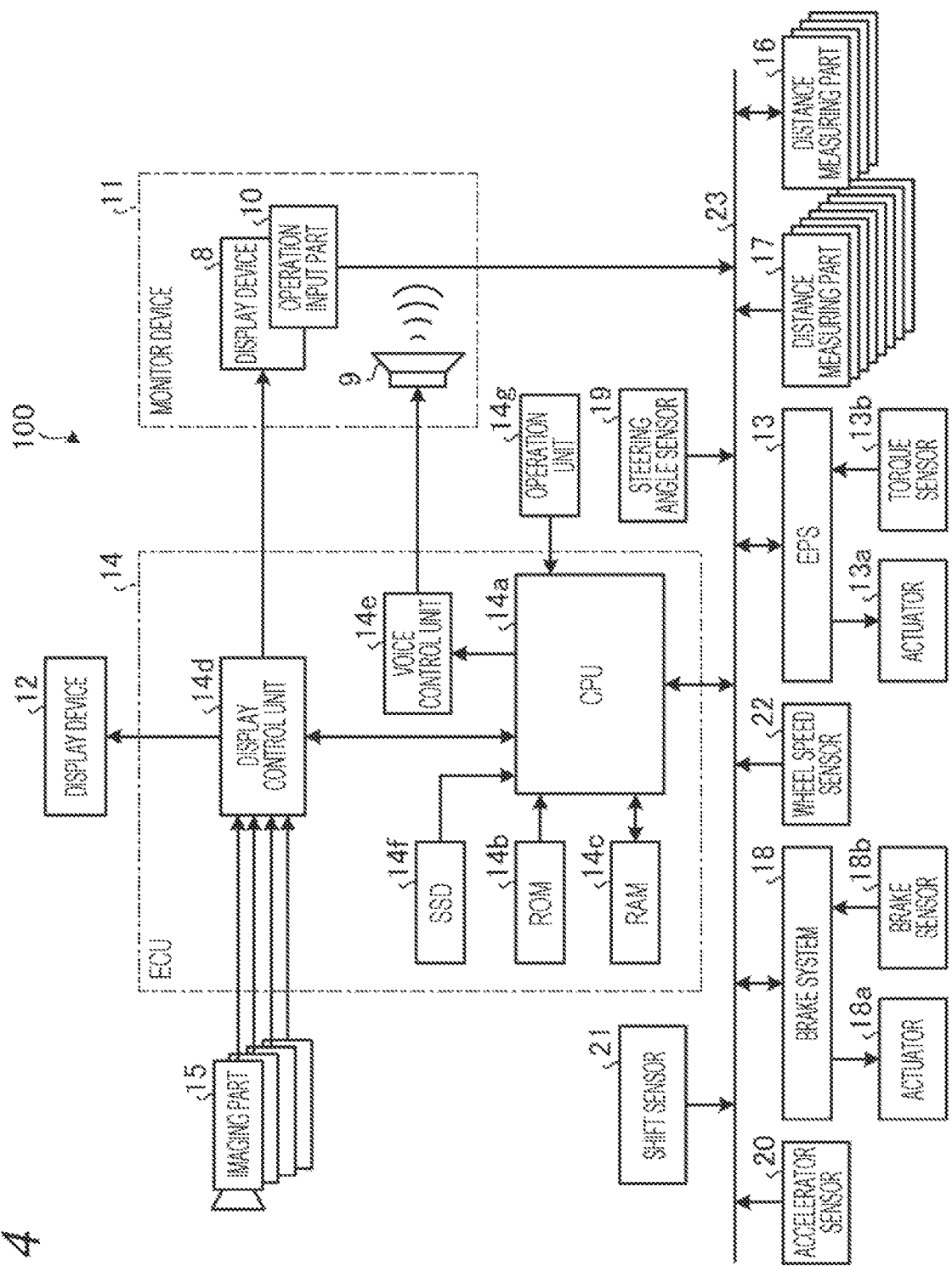
FIG. 4 is a block diagram illustrating a functional configuration of a parking assistance system according to the embodiment.

FIG. 4 is a block diagram illustrating a functional configuration of a parking assistance system according to the embodiment; As illustrated in FIG. 4, the vehicle 1 has an electric power steering system (EPS) 13 that steers at least two wheels 3. The EPS 13 includes an actuator 13a and a torque sensor 13b. The EPS 13 is electrically controlled by an electronic control unit (ECU) 14 or the like to operate the actuator 13a. In the following description, the EPS 13 is an electric power steering system, a steer by wire (SBW) system, or the like. The EPS 13 applies torque, that is, assist torque, to the steering unit 4 by the actuator 13a to supplement steering force, and steers the wheel 3 by the actuator 13a. In this case, the actuator 13a may steer one wheel 3 or may steer a plurality of the wheels 3. In addition, the torque sensor 13b detects, for example, a torque applied to the steering unit 4 by the driver.

As illustrated in FIG. 2, the vehicle body 2 is provided with, for example, four imaging parts 15a to 15d as a plurality of imaging parts 15.

Furthermore, the ECU 14 identifies, from the image of the imaging part 15, a section line or the like indicated on a road surface around the vehicle 1, and detects (extracts) a parking lot indicated by the section line or the like.

As illustrated in FIGS. 1 and 2, the vehicle body 2 is provided with, for example, four distance measuring parts 16a to 16d and eight distance measuring parts 17a to 17h as a plurality of distance measuring parts 16 and 17. The distance measuring parts 16 and 17 are sonars that emit ultrasonic waves and capture reflected waves thereof, for example.

As illustrated in FIG. 4, in a parking assistance system 100, a brake system 18, a steering angle sensor 19, an accelerator sensor 20, a shift sensor 21, a wheel speed sensor 22, and the like are further electrically connected via an in-vehicle network 23 as an electric communication line.

The in-vehicle network 23 is configured as, for example, a controller area network (CAN). The ECU 14 can control the EPS 13, the brake system 18, and the like by sending a control signal through the in-vehicle network 23. Furthermore, the ECU 14 can receive detection results of the torque sensor 13b, the brake sensor 18b, the steering angle sensor 19, the distance measuring part 16, the distance measuring part 17, the accelerator sensor 20, the shift sensor 21, the wheel speed sensor 22, and the like, operation signals of the operation input part 10 and the like via the in-vehicle network 23.

As illustrated in FIG. 4, the ECU 14 has, for example, a central processing unit (CPU) 14a, a read only memory (ROM) 14b, a random access memory (RAM) 14c, a display control unit 14d, a voice control unit 14e, a solid state drive or flash memory (SSD) 14f, and the like.

For example, the CPU 14a can execute various types of arithmetic processing and control such as image processing related to images displayed on the display devices 8 and 12, determination of a target position (parking target position) of the vehicle 1, calculation of a movement route of the vehicle 1, determination of presence or absence of interference with an object, automatic control of the vehicle 1, and cancellation of the automatic control. The CPU 14a can read a program installed and stored in a nonvolatile storage device such as the ROM 14b and execute arithmetic processing according to the program.

The RAM 14c temporarily stores various data used in the calculation in the CPU 14a. In addition, the display control unit 14d mainly executes image processing using image data obtained by the imaging part 15, combination of image data displayed on the display devices 8 and 12, and the like among the arithmetic processing in the ECU 14. In addition, the voice control unit 14e mainly executes processing of voice data output by the sound output device 9 in the arithmetic processing in the ECU 14. The SSD 14f is a rewritable nonvolatile storage unit, and can store data even when a power supply of the ECU 14 is turned off.

Note that the CPU 14a, the ROM 14b, the RAM 14c, and the like can be integrated in the same package. Furthermore, the ECU 14 may have a configuration in which another logical operation processor such as a digital signal processor (DSP), or a logic circuit, or the like is used instead of the CPU 14a. In addition, a hard disk drive (HDD) may be provided instead of the SSD 14f, and the SSD 14f and the HDD may be provided separately from the ECU 14.

The brake system 18 is, for example, an anti-lock brake system (ABS) that suppresses locking of a brake, an electronic stability control (ESC) that suppresses skidding of the vehicle 1 at the time of cornering, an electric brake system that enhances braking force (executes brake assist), a brake by wire (BBW), or the like. The brake system 18 applies a braking force to the wheel 3 and thus the vehicle 1 via the actuator 18a.

In addition, the brake system 18 can execute various controls by detecting a lock of the brake, idle rotation of the wheel 3, a sign of skidding, or the like from a rotation difference between the left and right wheels 3, or the like. The brake sensor 18b is, for example, a sensor that detects a position of a movable portion of the braking operation unit 6. The brake sensor 18b can detect a position of a brake pedal as a movable portion of the braking operation unit 6. The brake sensor 18b includes a displacement sensor.

The steering angle sensor 19 is, for example, a sensor that detects a steering amount of the steering unit 4 such as a steering wheel. The steering angle sensor 19 is configured using, for example, a Hall element or the like. The ECU 14 acquires a steering amount of the steering unit 4 by the driver, a steering amount of each wheel 3 at the time of automatic steering, and the like from the steering angle sensor 19 and executes various controls. Note that the steering angle sensor 19 detects a rotation angle of a rotating part included in the steering unit 4. The steering angle sensor 19 is an example of an angle sensor.

The accelerator sensor 20 is, for example, a sensor that detects a position of a movable portion of the acceleration operation unit 5. The accelerator sensor 20 can detect a position of the accelerator pedal as a movable portion of the acceleration operation unit 5. The accelerator sensor 20 includes a displacement sensor.

The shift sensor 21 is, for example, a sensor that detects a position of a movable portion of the shift operation unit 7.

The shift sensor 21 can detect positions of a lever, an arm, a button, and the like as movable portions of the shift operation unit 7. The shift sensor 21 may include a displacement sensor or may be configured as a switch.

The wheel speed sensor 22 is a sensor that detects a rotation amount or a rotation speed per unit time of the wheel 3. The wheel speed sensor 22 outputs the number of wheel speed pulses indicating the detected rotation speed as a sensor value. The wheel speed sensor 22 can be configured using, for example, a Hall element or the like. The ECU 14 calculates a movement amount and the like of the vehicle 1 based on the sensor value acquired from the wheel speed sensor 22 and executes various controls. Note that the wheel speed sensor 22 may be provided in the brake system 18. In this case, the ECU 14 acquires a detection result of the wheel speed sensor 22 via the brake system 18.

Note that the configurations, arrangements, electrical connection forms, and the like of the various sensors and actuators described above are examples, and can be variously set (changed).

In the present embodiment, the ECU 14 achieves at least a part of the function as the parking assistance device by cooperation of hardware and software (control program).

Figure 5:
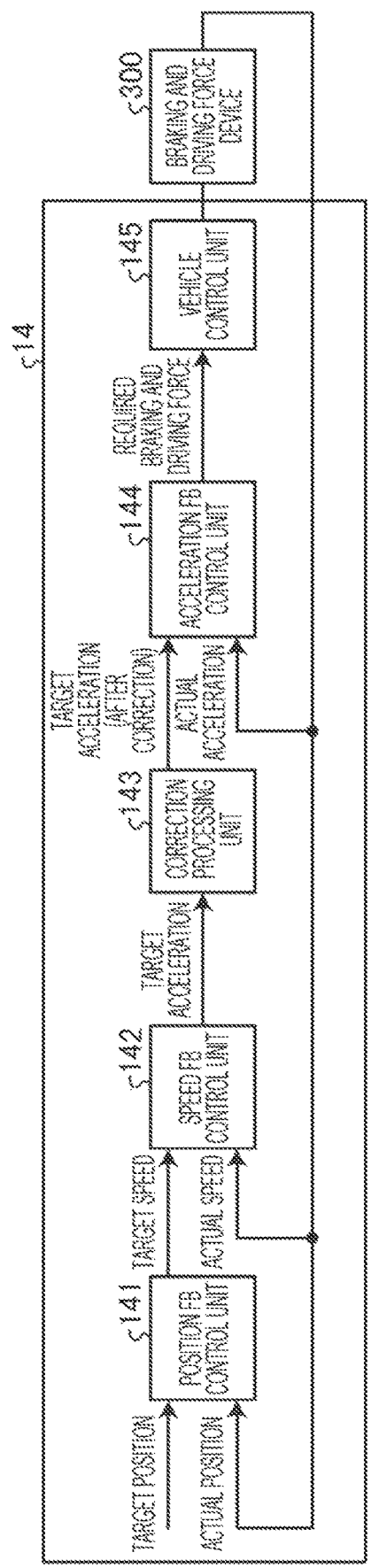
FIG. 5 is a block diagram illustrating a functional configuration of an ECU according to the embodiment.

FIG. 5 is a block diagram illustrating a functional configuration of the ECU 14 of the embodiment. The ECU 14 includes, as a functional configuration, a position feedback (FB) control unit 141, a speed FB control unit 142, a correction processing unit 143, an acceleration FB control unit 144, and a vehicle control unit 145. The position FB control unit 141, the speed FB control unit 142, and the acceleration FB control unit 144 execute, for example, proportional-integral (PI) control as feedback (FB) control, but are not limited thereto, and may execute proportional-integral-differential (PID) control or the like.

The position FB control unit 141 calculates, based on deviation between a target parking position and an actual position of the vehicle 1, a target speed. The position FB control unit 141 is an example of a target speed control unit that calculates a target speed for moving the vehicle 1 to a target parking position of the vehicle 1.

The speed FB control unit 142 calculates, based on deviation between a target speed and an actual speed of the vehicle 1, a target acceleration.

Figure 6:
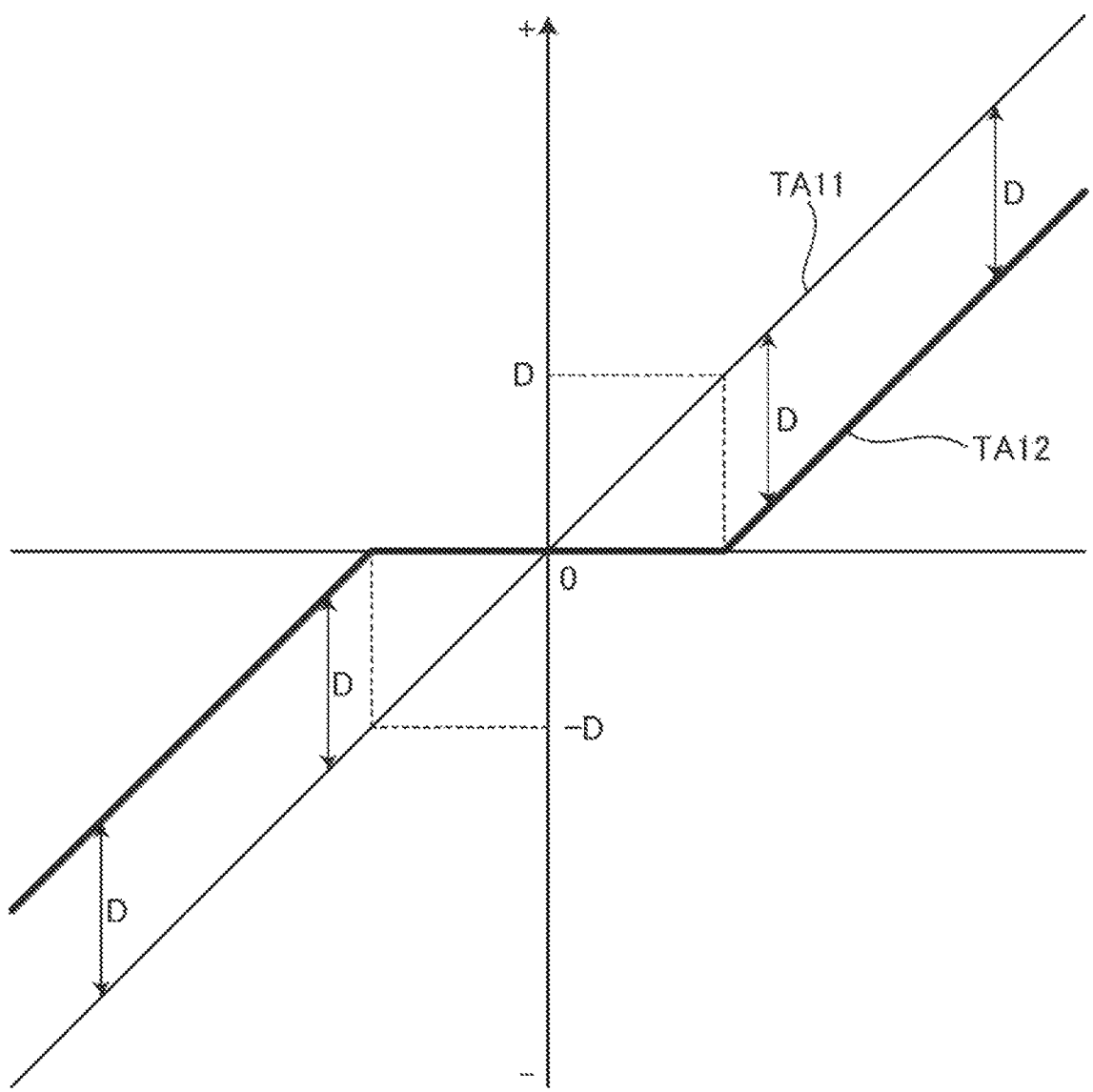
FIG. 6 is a graph illustrating a relationship between a target acceleration before correction and a target acceleration after correction in the embodiment.

Hereinafter, FIG. 6 will also be referred to. In FIG. 6, a vertical axis represents a target acceleration. FIG. 6 is a graph illustrating a relationship between a target acceleration before correction and a target acceleration after correction in the embodiment;

The correction processing unit 143 corrects the target acceleration so that an absolute value becomes small when the target speed is constant. For example, in a dead zone processing mode in which the target speed is constant, the correction processing unit 143 corrects the target acceleration to 0 in a case where the target acceleration falls within a range of a predetermined dead zone, and corrects the target acceleration so that the absolute value decreases by a predetermined offset value in a case where the target acceleration is not fallen within the range of the dead zone.

In the example of FIG. 6, when the correction processing unit 143 performs correction on a value of any one point of a target acceleration TA11 before correction, a value of a point having the same position on a horizontal axis in a target acceleration TA12 after correction is output. Specifically, when the target acceleration TA11 before correction is within a range (−D to D) of the dead zone, the target acceleration TA12 after correction becomes 0. Note that D is set to an appropriate value in advance by experiment, simulation, or the like.

Moreover, in a case where the target acceleration TA11 before correction is not fallen within the range of the dead zone, the absolute value of the target acceleration TA12 after correction decreases by an offset value D.

Returning to FIG. 5, in a case where the target speed changes and the dead zone processing mode is switched to a normal mode in which the target speed is not constant, the correction processing unit 143 corrects the target acceleration so that the change rate of the target acceleration does not exceed a predetermined change rate upper limit value.

The acceleration FB control unit 144 calculates, based on deviation between a target acceleration and an actual acceleration of the vehicle 1, a required braking and driving force.

The vehicle control unit 145 controls a braking and driving force of the vehicle 1 by outputting an instruction signal to a braking and driving force device 300 (engine, brake system 18, and the like) based on the required braking and driving force.

Note that the vehicle control unit 145 may include a function of the acceleration FB control unit 144. That is, the vehicle control unit 145 may control the braking and driving force of the vehicle 1 based on the target acceleration. In this case, the "vehicle control unit" described in the claims corresponds to the acceleration FB control unit 44 and the vehicle control unit 145 in the embodiment.

Next, a difference in temporal change of each parameter between the prior art and the present embodiment will be described with reference to FIGS. 7A, 7B and FIGS. 8A, 8B, and 8C.

Figure 7:
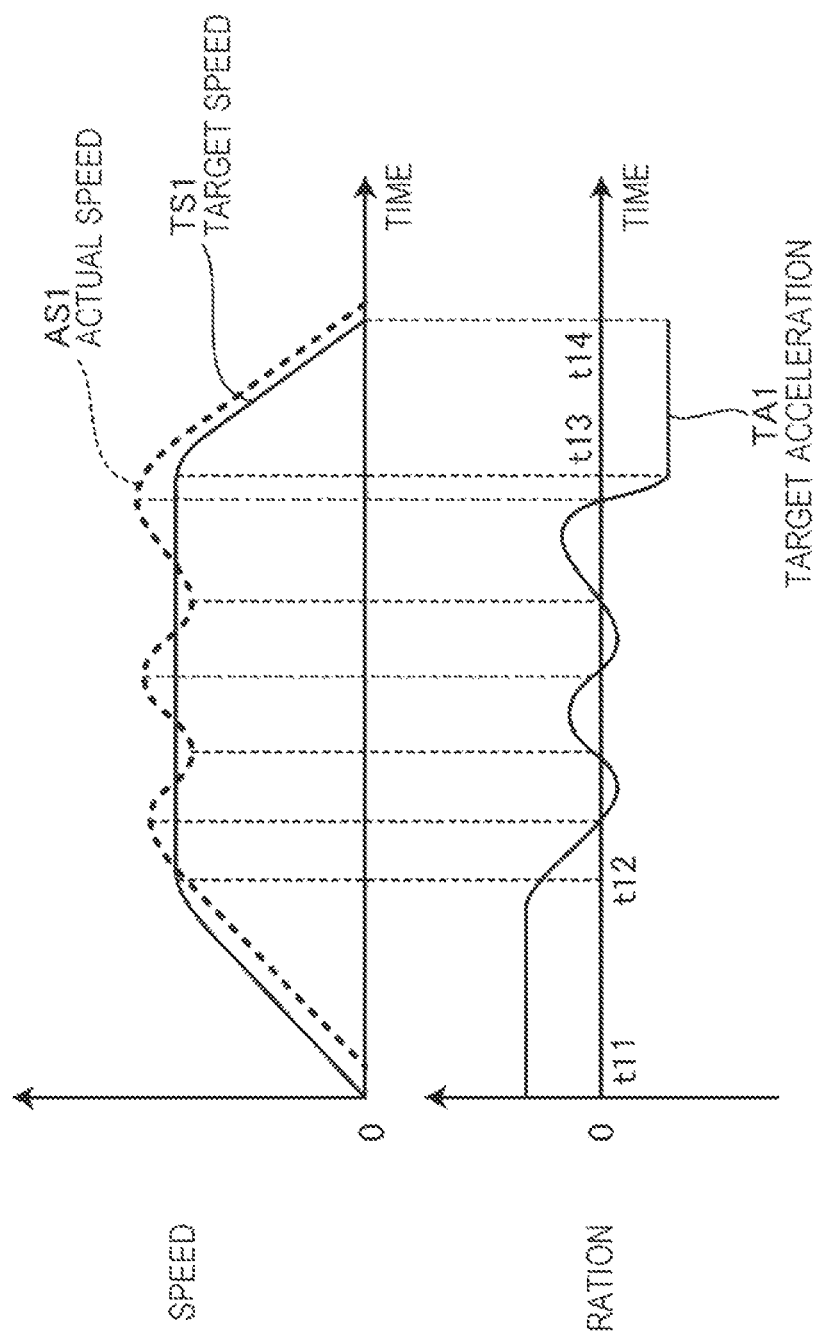
FIGS. 7A and 7B are graphs illustrating an example of a temporal change of each parameter in the prior art.

FIGS. 7A and 7B are graphs each illustrating an example of a temporal change of each parameter in the prior art. FIG.

7A is a graph of speed, and FIG. 7B is a graph of acceleration. In the parking assistance in the prior art, the parking assistance control is started at time t11, a target speed TS1 increases from time t11 to time t12, becomes constant from time t12 to time t13, and decreases from time t13 to time t14.

At that time, while the target speed TS1 is between a certain time t12 and time t13, for example, unnecessary acceleration or deceleration for the vehicle subjected to assistance may occur due to various factors such as a road surface condition (step, low friction road surface, or the like) and an aging degradation of a braking and driving force device (engine, brake, or the like). In the example of FIGS. 7A and 7B, hunting (vibration) occurs in an actual speed AS1 and a target acceleration TA1, and at this time, unnecessary increase or decrease of the actual acceleration which is not illustrated is repeated (that is, unnecessary acceleration or deceleration occurs). In this manner, when the target speed is constant, if unnecessary acceleration or deceleration occurs, an occupant easily feels deterioration of ride comfort, and thus improvement is desired.

Figure 8:
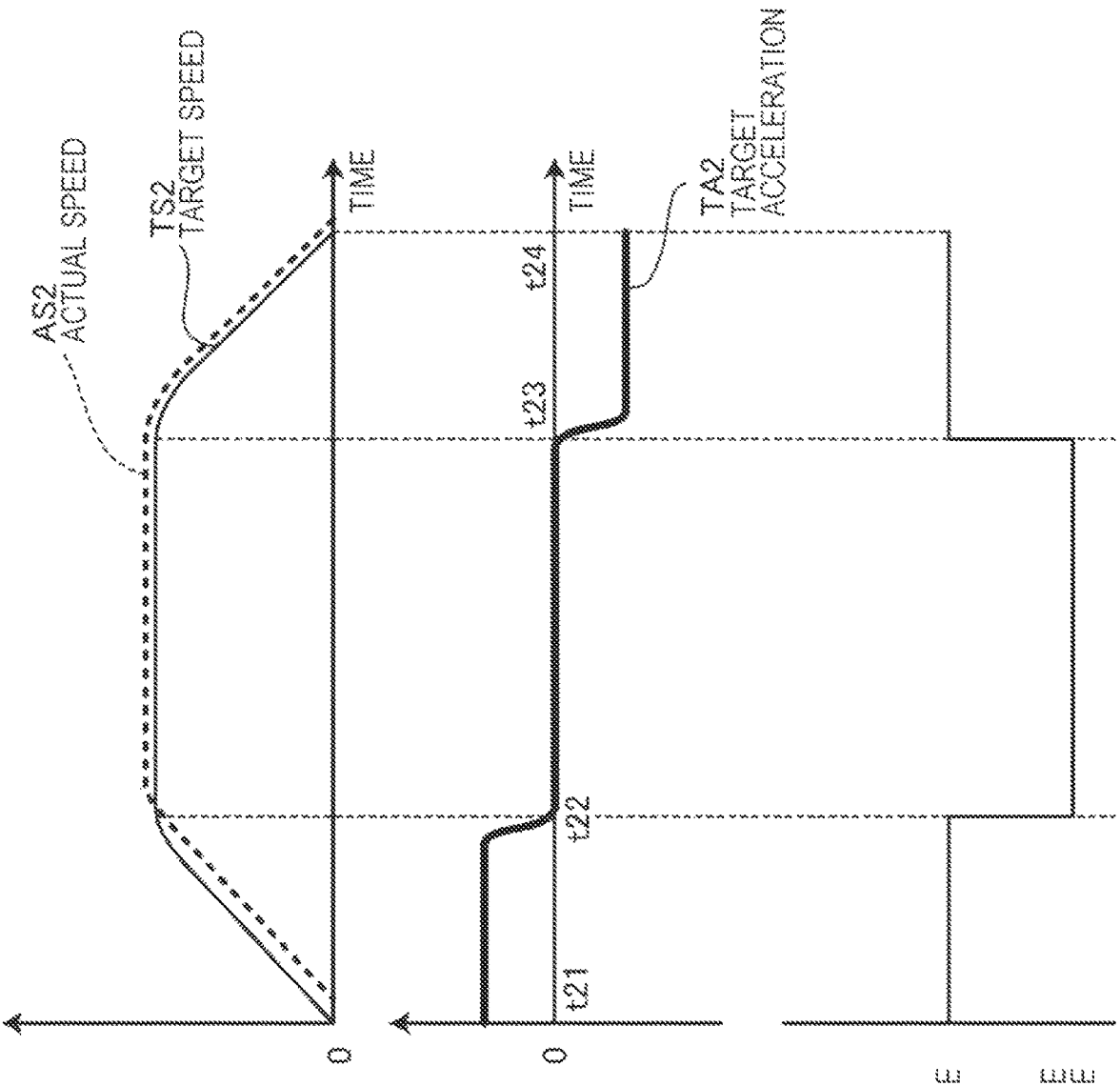
FIGS. 8A, 8B, and 8C are graphs illustrating an example of a temporal change of each parameter in the embodiment.

On the other hand, FIGS. 8A to 8C are graphs each illustrating an example of a temporal change of each parameter in the embodiment. FIG. 8A is a graph of speed, FIG. 8B is a graph of acceleration, and FIG. 8C is a mode transition diagram. In the parking assistance according to the present embodiment, the parking assistance control is started at time t21, a target speed TS1 increases from time t21 to time t22, becomes constant from time t22 to time t23, and decreases from time t23 to time t24. This point is similar to the case of the prior art.

Then, in the dead zone processing mode in which the target speed TS1 is constant from time t22 to time t23, the correction processing unit 143 corrects the target acceleration TA2 so that the absolute value becomes small (in the example of FIG. 8B, the target acceleration TA2 is set to 0) (FIG. 6). Therefore, for example, even if there are various factors such as the road surface condition (step, low friction road surface, and the like) and the aging degradation of the braking and driving force device (engine, brake, and the like), hunting (vibration) does not occur in the actual speed AS2 and the target acceleration TA2, and at this time, unnecessary increase or decrease does not occur in the actual acceleration which is not illustrated. That is, since unnecessary acceleration or deceleration does not occur in the vehicle subjected to assistance (even if the acceleration or deceleration occurs, the acceleration or deceleration is smaller than that in the prior art), deterioration of the ride comfort of the occupant is suppressed.

Figure 9:
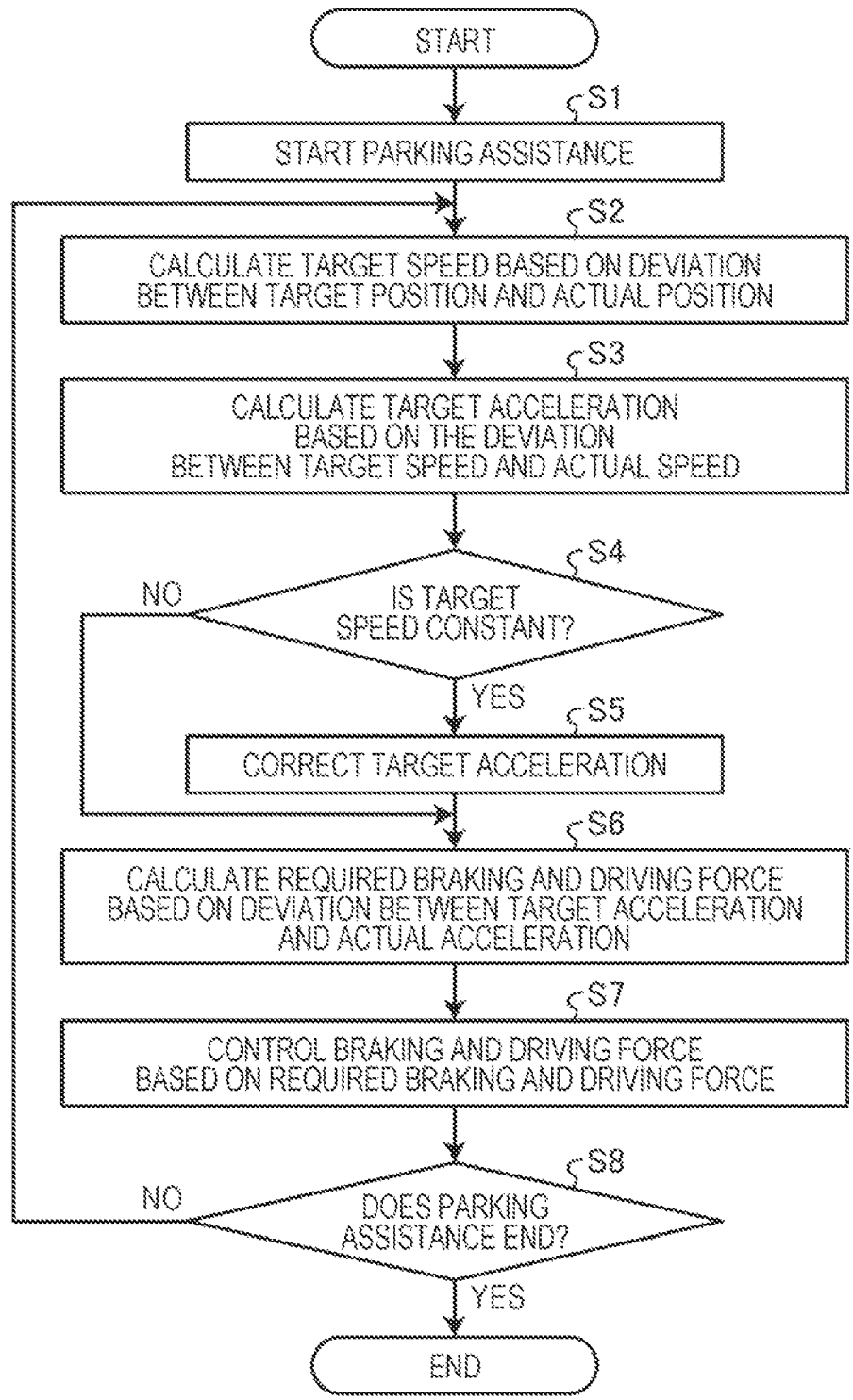
FIG. 9 is a flowchart illustrating processing by the ECU according to the embodiment.

Next, processing by the ECU 14 according to the embodiment will be described with reference to FIG. 9. FIG. 9 is a flowchart illustrating processing by the ECU 14 according to the embodiment. Note that, during this processing, the ECU 14 calculates and acquires various kinds of information such as a target position, an actual position, an actual speed, and an actual acceleration of the vehicle 1.

In step S1, the ECU 14 starts parking assistance in response to the operation by the driver.

In step S2, the position FB control unit 141 calculates, based on deviation between a target parking position and an actual position of the vehicle 1, a target parking position.

In step S3, the speed FB control unit 142 calculates, based on deviation between a target speed and an actual speed of the vehicle 1, a target acceleration.

In step S4, the correction processing unit 143 determines whether the target speed is constant. If Yes, the processing proceeds to step S5, and if No, the processing proceeds to step S6.

In step S5, the correction processing unit 143 corrects the target acceleration so that the absolute value becomes small (FIG. 6).

In step S6, the actual acceleration FB control unit 144 calculates, based on deviation between a target acceleration and an actual acceleration of the vehicle 1, a required braking and driving force.

In step S7, the vehicle control unit 145 controls the braking and driving force of the vehicle 1 by outputting an instruction signal to the braking and driving force device 300 based on the required braking and driving force.

In step S8, the ECU14 determines whether the parking assistance ends. If Yes, the processing ends, and if No, the processing returns to step S2.

As described above, according to the ECU 14 of the present embodiment, when the target speed is constant, unnecessary acceleration or deceleration can be suppressed by correcting the target acceleration so that the absolute value becomes small. Note that the suppression here is not limited to zero, and means that the suppression is reduced as compared with the case of the prior art.

In addition, specifically, as illustrated in FIG. 6, when the target acceleration TA11 is within a range (−D to D) of the dead zone, the target acceleration TA12 after correction becomes 0. Moreover, in a case where the target acceleration TA11 is not fallen within the range (−D to D) of the dead zone, the absolute value of the target acceleration TA12 after correction decreases by an offset value D. As a result, unnecessary acceleration or deceleration can be suppressed, and a significant decrease in followability of the actual acceleration with respect to the target acceleration can be avoided.

In addition, in a case where the dead zone processing mode is switched to the normal mode, the target acceleration is corrected so that a change rate (jerk) of the target acceleration does not exceed a predetermined change rate upper limit value.

As a result, it is possible to avoid a situation in which the change rate in acceleration becomes too large and the ride comfort deteriorates.

Note that, conventionally, it is known that the ride comfort of the vehicle deteriorates not only when the acceleration increases but also when the change rate in acceleration increases.

The program executed by the vehicle 1 may be provided as a computer program product by being stored in a computer-readable storage medium such as a CD-ROM, a CD-R, a memory card, a digital versatile disk (DVD), and a flexible disk (FD) as a file in an installable format or an executable format. Furthermore, the program may be provided by being stored on a computer connected to a network such as the Internet and downloaded via the network. Furthermore, the program may be provided or distributed via a network such as the Internet.

For example, in FIG. 6, the target acceleration TA12 after correction is shown in a linear graph, but may be in a non-linear graph (graph of a quadratic function, an exponential function, or the like). That is, the offset value when target acceleration is corrected is not limited to being constant regardless of magnitude of the target acceleration, and may be changed according to the magnitude of the target acceleration.

A parking assistance device includes: a target speed control unit that calculates a target speed for moving the vehicle subjected to assistance to a target parking position of the vehicle subjected to assistance; a speed feedback control unit that calculates a target acceleration based on deviation between the target speed and an actual speed of the vehicle subjected to assistance; a correction processing unit that corrects the target acceleration so that an absolute value becomes small when the target speed is constant; and a vehicle control unit that controls a braking and driving force of the vehicle subjected to assistance based on the target acceleration.

With this configuration, when a target speed is constant, unnecessary acceleration or deceleration can be suppressed by correcting target acceleration so that an absolute value becomes small.

Furthermore, in the parking assistance device, in a dead zone processing mode in which the target speed is constant, the correction processing unit corrects the target acceleration to 0 in a case where the target acceleration falls within a range of a predetermined dead zone, and corrects the target acceleration so that the absolute value decreases by a predetermined offset value in a case where the target acceleration is not fallen within the range of the dead zone.

With this configuration, a target acceleration is corrected to 0 in a case where the target acceleration falls within a range of a dead zone. Moreover, in a case where the target acceleration is not fallen within the range of the dead zone, the target acceleration is corrected so that an absolute value decreases by a predetermined offset value. As a result, unnecessary acceleration or deceleration can be suppressed, and a significant decrease in followability of the actual acceleration with respect to the target acceleration can be avoided.

Furthermore, in the parking assistance device, in a case where the target speed changes and the dead zone processing mode in which the target speed is constant is switched to a normal mode in which the target speed is not constant, the correction processing unit corrects the target acceleration so that the change rate of the target acceleration does not exceed a predetermined change rate upper limit value.

With this configuration, when the dead zone processing mode is switched to the normal mode, it is possible to avoid a situation in which the change rate of the target acceleration becomes too large and the ride comfort deteriorates.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A parking assistance device comprising:
    a target speed control unit that calculates a target speed for moving the vehicle subjected to assistance to a target parking position of the vehicle subjected to assistance;
    a speed feedback control unit that calculates a target acceleration based on deviation between the target speed and an actual speed of the vehicle subjected to assistance;
    a correction processing unit that corrects the target acceleration so that an absolute value becomes small when the target speed is constant; and
    a vehicle control unit that controls a braking and driving force of the vehicle subjected to assistance based on the target acceleration.

2. The parking assistance device according to claim 1, wherein
    in a dead zone processing mode in which the target speed is constant, the correction processing unit
    corrects the target acceleration to 0 in a case where the target acceleration falls within a range of a predetermined dead zone, and
    corrects the target acceleration so that the absolute value decreases by a predetermined offset value in a case where the target acceleration is not fallen within the range of the dead zone.

3. The parking assistance device according to claim 1, wherein, in a case where the target speed changes and the dead zone processing mode in which the target speed is constant is switched to a normal mode in which the target speed is not constant, the correction processing unit corrects the target acceleration so that the change rate of the target acceleration does not exceed a predetermined change rate upper limit value.

* * * * *